US011288171B2

(12) United States Patent
Nishiwaki et al.

(10) Patent No.: US 11,288,171 B2
(45) Date of Patent: Mar. 29, 2022

(54) DATA VERIFICATION APPARATUS, METHOD AND MEDIUM FOR DETERMINING WHETHER REFERRING PARTS OF SOURCE CODE ARE EXECUTED

(71) Applicant: Mitsubishi Electric Corporation, Tokyo (JP)

(72) Inventors: Masaji Nishiwaki, Tokyo (JP); Tadataka Asakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/645,940

(22) PCT Filed: Oct. 20, 2017

(86) PCT No.: PCT/JP2017/037998
§ 371 (c)(1),
(2) Date: Mar. 10, 2020

(87) PCT Pub. No.: WO2019/077738
PCT Pub. Date: Apr. 25, 2019

(65) Prior Publication Data
US 2020/0201746 A1 Jun. 25, 2020

(51) Int. Cl.
*G06F 11/36* (2006.01)

(52) U.S. Cl.
CPC ...... *G06F 11/3676* (2013.01); *G06F 11/3684* (2013.01); *G06F 11/3688* (2013.01); *G06F 11/3692* (2013.01)

(58) Field of Classification Search
CPC ....... G06F 11/302; G06F 11/3089–328; G06F 11/3476; G06F 11/3668–3696; G06F 11/36–3696

(Continued)

(56) References Cited

U.S. PATENT DOCUMENTS

| 5,819,094 A | 10/1998 | Sato et al. |
| 6,748,584 B1 * | 6/2004 | Witchel ............... G06F 8/71 714/37 |

(Continued)

FOREIGN PATENT DOCUMENTS

| JP | 08-314752 A | 11/1996 |
| JP | 09-259011 A | 10/1997 |
| JP | 2000305812 A | 11/2000 |
| JP | 2015035185 A | 2/2015 |

(Continued)

OTHER PUBLICATIONS

Horgan J., et al., "Achieving Software Quality with Testing Coverage Measures", Computer, vol. 27 Issue 9 [online], 1994 [retrieved Aug. 11, 2020], Retrieved from Internet: <URL: https://ieeexplore.ieee.org/abstract/document/312032>, pp. 60-69.*

(Continued)

*Primary Examiner* — Todd Aguilera
(74) *Attorney, Agent, or Firm* — Buchanan Ingersoll & Rooney PC

(57) ABSTRACT

A data verification apparatus embeds a log output code that outputs a log in a referring part that is in a source code and refers to definition data, and generates a test code. The data verification apparatus instructs a test execution apparatus to execute the test code that test data is provided as an input. The data verification apparatus refers to the log outputted by executing the test code. Then, the data verification apparatus determines whether the referring part has been executed when the test data has been provided as the input.

18 Claims, 13 Drawing Sheets

(58) Field of Classification Search
USPC .................................................. 717/124–135
See application file for complete search history.

(56) References Cited

U.S. PATENT DOCUMENTS

2004/0221270 A1* 11/2004 Witchel ..................... G06F 8/71
717/124
2006/0294503 A1* 12/2006 Henderson .......... G06F 11/3604
717/131

FOREIGN PATENT DOCUMENTS

| JP | 2016048471 A | 4/2016 |
|----|--------------|--------|
| JP | 2016167180 A | 9/2016 |

OTHER PUBLICATIONS

Horgan, J., et al., "A Data Flow Coverage Testing Tool for C", Proceedings of the Second Symposium on Assessment of Quality Software Development Tools [online], 1992 [retrieved Aug. 11, 2020], Retrieved from Internet: <URL: https://www.computer.org/csdl/proceedings-article/aqsdt/1992/00205829/12OmNBQ2VRt>, pp. 2-10.*

Misurda, J., et al., "Demand Driven Structural Testing with Dynamic Instrumentation", Proceedings of the 27th Int'l Conf. on Software Engineering [online], 2005 [retrieved Feb. 22, 2021], Retrieved from Internet: <URL: https://ieeexplore.ieee.org/abstract/document/1553558>, pp. 156-165.*

Lelis, J., "value_struct: Read Only structs in Ruby", Working with Ruby [online], 2012 [retrieved Jun. 2, 2021], Retrieved from Internet: <URL: https://rbjl.janlelis.com/65-value_struct-read-only-structs-in-ruby>, pp. 1-3.*

International Search Report (with English Translation) and Written Opinion issued in corresponding International Patent Application No. PCT/ PCT/JP2017/037998, 9 pages (dated Jan. 9, 2018).

Office Action (Notice of Reasons for Refusal) dated Jan. 5, 2021, by the Japanese Patent Office in corresponding Japanese Patent Application No. 2019-549079 and English translation of the Office Action. (7 pages).

First Examination Report dated Oct. 27, 2021, issued in the corresponding United Kingdom Patent Application No. 2004790.8, 4 pages.

\* cited by examiner

| TEST NUMBER | TEST DATA |
|---|---|
| T001 | DATA 1 |
| T002 | DATA 2 |
| ⋮ | ⋮ |

| | def1 | def2 | ... |
|---|---|---|---|
| T001 | x | – | ... |
| T002 | x | x | ... |
| ... | ... | ... | ... |

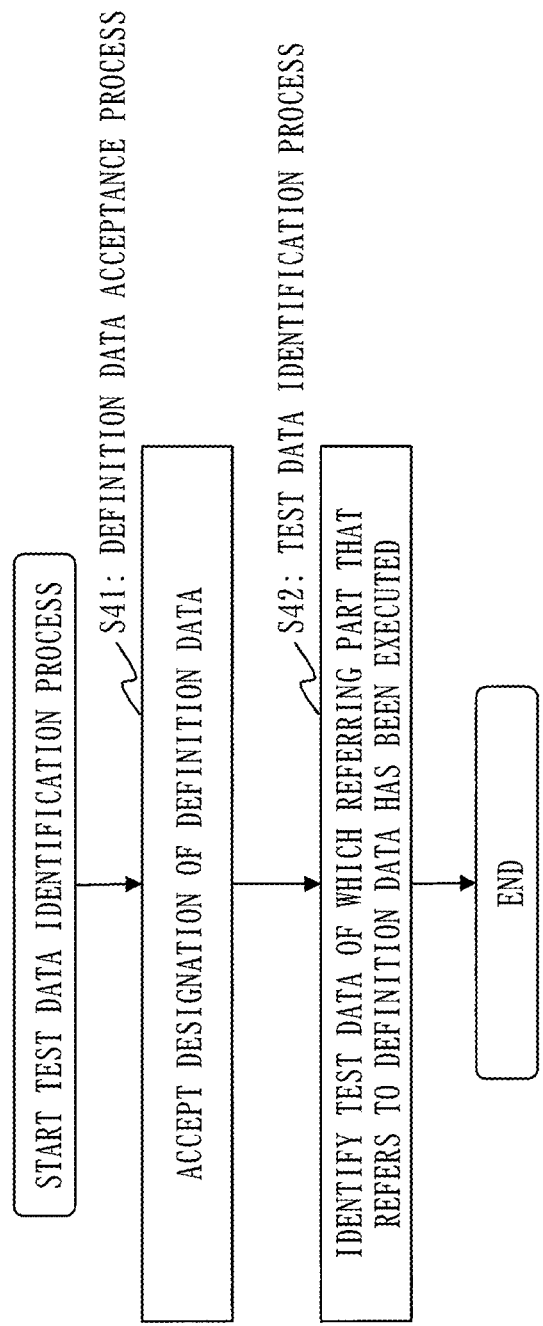

DATA VERIFICATION APPARATUS, METHOD AND MEDIUM FOR DETERMINING WHETHER REFERRING PARTS OF SOURCE CODE ARE EXECUTED

TECHNICAL FIELD

The present invention relates to a technique of supporting a data verification test when a data definition of software is changed.

BACKGROUND ART

There is a case where logic of a program operating normally is modified. In this case, a regression test needs to be executed to verify that the modification of logic has not affected logic that has not been modified. It is important to execute the regression test without fail in order to assure quality.

In Patent Literature 1, with regard to a degradation bug that is an error detected by the regression test, a technique of identifying a function and internal data that might have affected, without depending on a rule of thumb of a person in charge of program development, is described. Also, in Patent Literature 2, a technique of identifying a pattern of a variable that has been changed, and generating test data to be used in the regression test when the variable is added, deleted, or renamed as a result of the modification of logic.

CITATION LIST

Patent Literature

Patent Literature 1: JP 2016-167180A
Patent Literature 2: JP 2015-035185A

SUMMARY OF INVENTION

Technical Problem

Software designed by a data-oriented approach uses a great amount of definition data to define data. When the software designed by the data-oriented approach is modified, there are a case in which logic and the definition data are modified and a case in which only the definition data, but not the logic, is modified. Even when only a modification of the definition data is implemented, without modifying the logic, a regression test needs to be executed in order to confirm that nothing is degraded by the modification. The modification of the definition data means a change in a scope of allowable values and the like.

Techniques described in Patent Literatures 1 and 2 are techniques of supporting the regression test executed when logic is modified. The techniques described in Patent Literatures 1 and 2 are not available for supporting the regression test when only definition data, but not logic, is modified.

An objective of the present invention is to support a regression test when only definition data, but not logic, is modified.

Solution to Problem

A data verification apparatus according to the present invention includes:

an embedding unit to embed a log output code that outputs a log in a referring part that is in a source code and refers to definition data, and generate a test code; and a result analysis unit to refer to the log outputted by executing the test code, providing test data as an input, and determine whether the referring part has been executed when the test data has been provided as the input.

Advantageous Effects of Invention

The present invention determines whether a referring part has been executed when test data has been provided as an input, based on a result of execution of a test code, a log output code that outputs a log being embedded in a referring part thereof that refers to definition data.

This enables specification on whether a test of the referring part that refers to the definition data is executed when the test data is provided as the input. This facilitates identification of the test data for a regression test.

BRIEF DESCRIPTION OF DRAWINGS

FIG. 5 is an explanatory drawing of information stored in a test data storage unit 231 according to Embodiment 1.
FIG. 12 is an explanatory drawing of a matrix stored in a matrix storage unit 131 according to Embodiment 2.
FIG. 13 is a flowchart of a test data identification process according to Embodiment 2.

DESCRIPTION OF EMBODIMENTS

Figure 1:
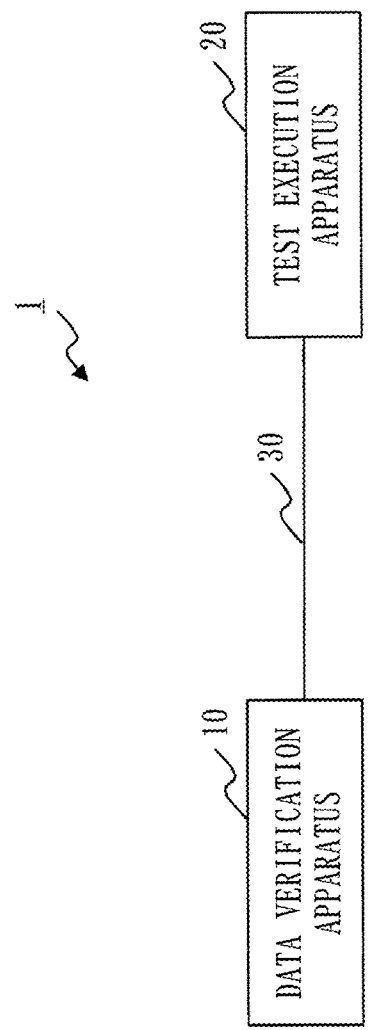
FIG. 1 is a configuration diagram of a data verification system 1 according to Embodiment 1.

Embodiment 1.
Description of Configuration
Referring to FIG. 1, a configuration of a data verification system 1 according to Embodiment 1 will be explained.
The data verification system 1 includes a data verification apparatus 10 and a test execution apparatus 20. The data verification apparatus 10 and the test execution apparatus 20 are computers. The data verification apparatus 10 and the test execution apparatus 20 are connected via a transmission line 30. The transmission line 30 is a local area network (LAN), a dedicated line, or the like.

In addition, the data verification apparatus 10 and the test execution apparatus 20 may be realized as one apparatus.

Figure 2:
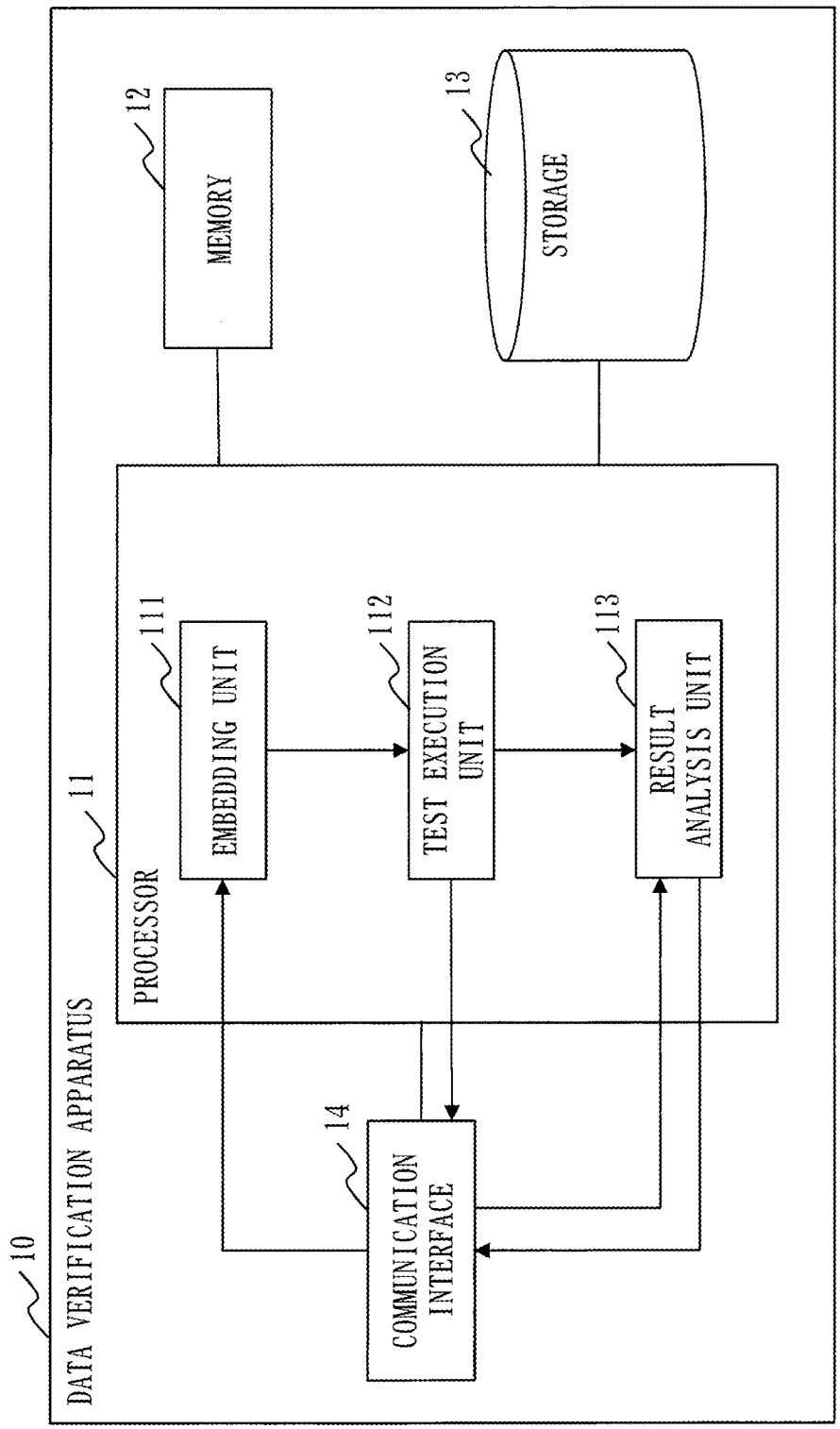
FIG. 2 is a configuration diagram of a data verification apparatus 10 according to Embodiment 1.

Referring to FIG. 2, a configuration of the data verification apparatus 10 according to Embodiment 1 will be explained.

The data verification apparatus 10 includes hardware of a processor 11, a memory 12, a storage 13, and a communication interface 14. The processor 11 is connected to other hardware via a signal line, and controls these other hardware.

The data verification apparatus 10 includes, as functional configuration components, an embedding unit 111, a test execution unit 112, and a result analysis unit 113. Functions of each of the functional configuration components of the data verification apparatus 10 are realized by software.

In the storage 13, a program to realize the functions of each of the functional configuration components of the data verification apparatus 10 is stored. The program is loaded into the memory 12 by the processor 11, and executed by the processor 11. This realizes the functions of each of the functional configuration components of the data verification apparatus 10.

Figure 3:
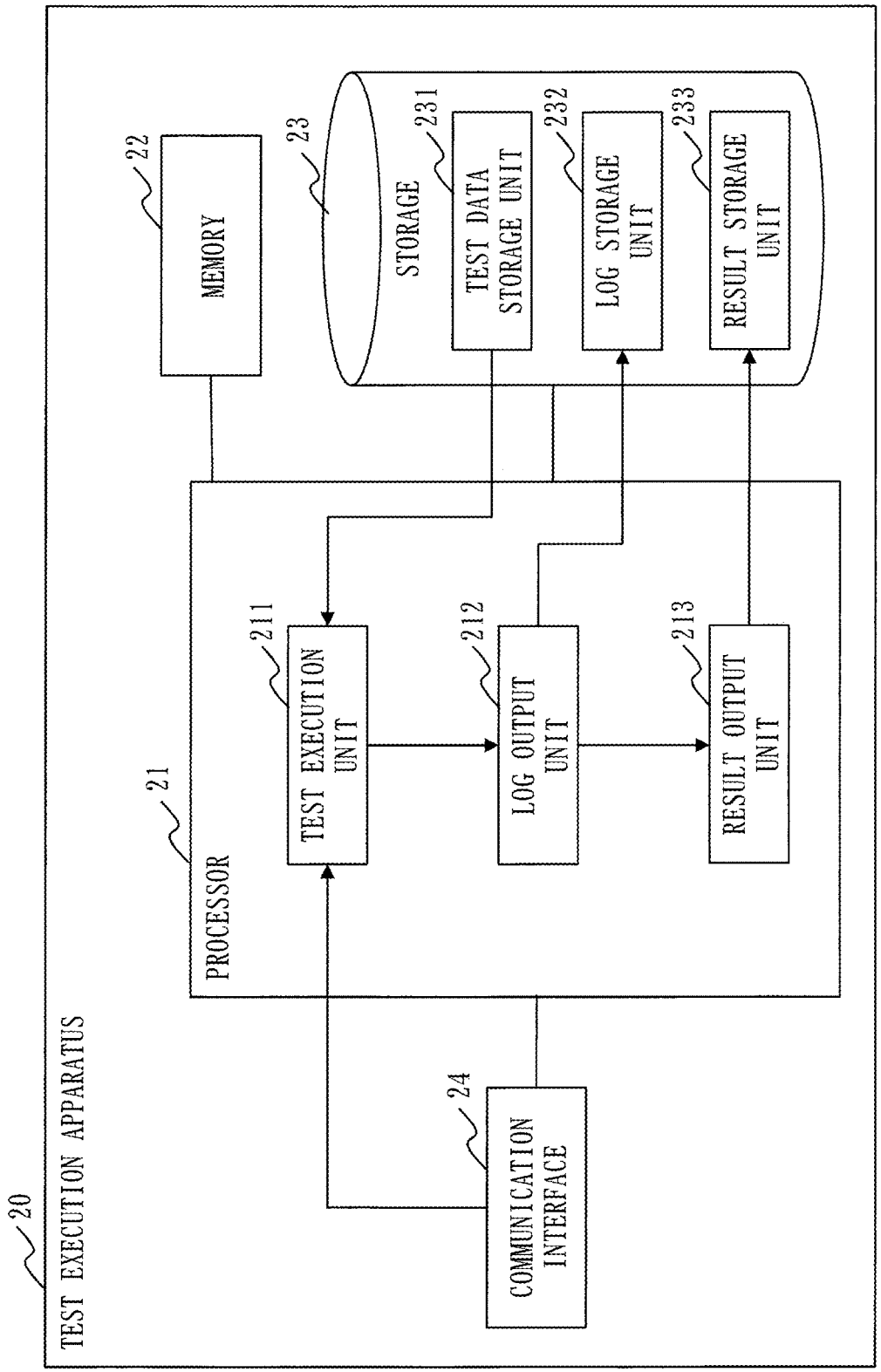
FIG. 3 is a configuration diagram of a test execution apparatus 20 according to Embodiment 1.

Referring to FIG. 3, a configuration of the test execution apparatus 20 according to Embodiment 1 will be explained.

The test execution apparatus 20 includes hardware of a processor 21, a memory 22, a storage 23, and a communication interface 24. The processor 21 is connected to other hardware via a signal line, and controls these other hardware.

The test execution apparatus 20 includes, as functional configuration components, a test execution unit 211, a log output unit 212, and a result output unit 213. Functions of each of the functional configuration components of the test execution apparatus 20 are realized by software.

In the storage 23, a program to realize the functions of each of the functional configuration components of the test execution apparatus 20 is stored. The program is loaded into the memory 22 by the processor 21, and executed by the processor 21. This realizes the functions of each of the functional configuration components of the test execution apparatus 20.

The storage 23 realizes functions of a test data storage unit 231, a log storage unit 232, and a result storage unit 233.

The processors 11 and 21 are integrated circuits (ICs) that perform processing. The processors 11 and 21 are, as a specific example, central processing units (CPUs), digital signal processors (DSPs), and graphics processing units (GPUs).

The memories 12 and 22 are storage devices that temporarily store data. The memories 12 and 22 are, as a specific example, static random access memories (SRAMs) and dynamic random access memories (DRAMs).

The storages 13 and 23 are storage devices that store data. The storages 13 and 23 are, as a specific example, hard disk drives (HDDs). In addition, the storages 13 and 23 may be portable storage media, such as secure digital (SD) memory cards, CFs (CompactFlashes), NAND flashes, flexible disks, optical discs, compact discs, Blu-ray (registered trademark) discs, and digital versatile disks (DVDs).

The communication interfaces 14 and 24 are interfaces to communicate with external devices. The communication interfaces 14 and 24 are, as a specific example, ports of Ethernet (registered trademark), Universal Serial Bus (USB), and High-Definition Multimedia Interface (HDMI, registered trademark).

The data verification apparatus 10 is connected to the transmission line 30 via the communication interface 14, and the test execution apparatus 20 is connected to the transmission line 30 via the communication interface 24. In addition, the data verification apparatus 10 is connected to devices, such as an input device and a display device, via the communication interface 14, and the test execution apparatus 20 is connected to devices, such as an input device and a display device, via the communication interface 24.

Description of Operation

Referring to FIGS. 4 to 7, operation of a data verification system 1 according to Embodiment 1 will be explained.

The operation of the data verification system 1 according to Embodiment 1 corresponds to a data verification method according to Embodiment 1. In addition, the operation of the data verification system 1 according to Embodiment 1 corresponds to processes of a data verification program according to Embodiment 1.

Figure 4:
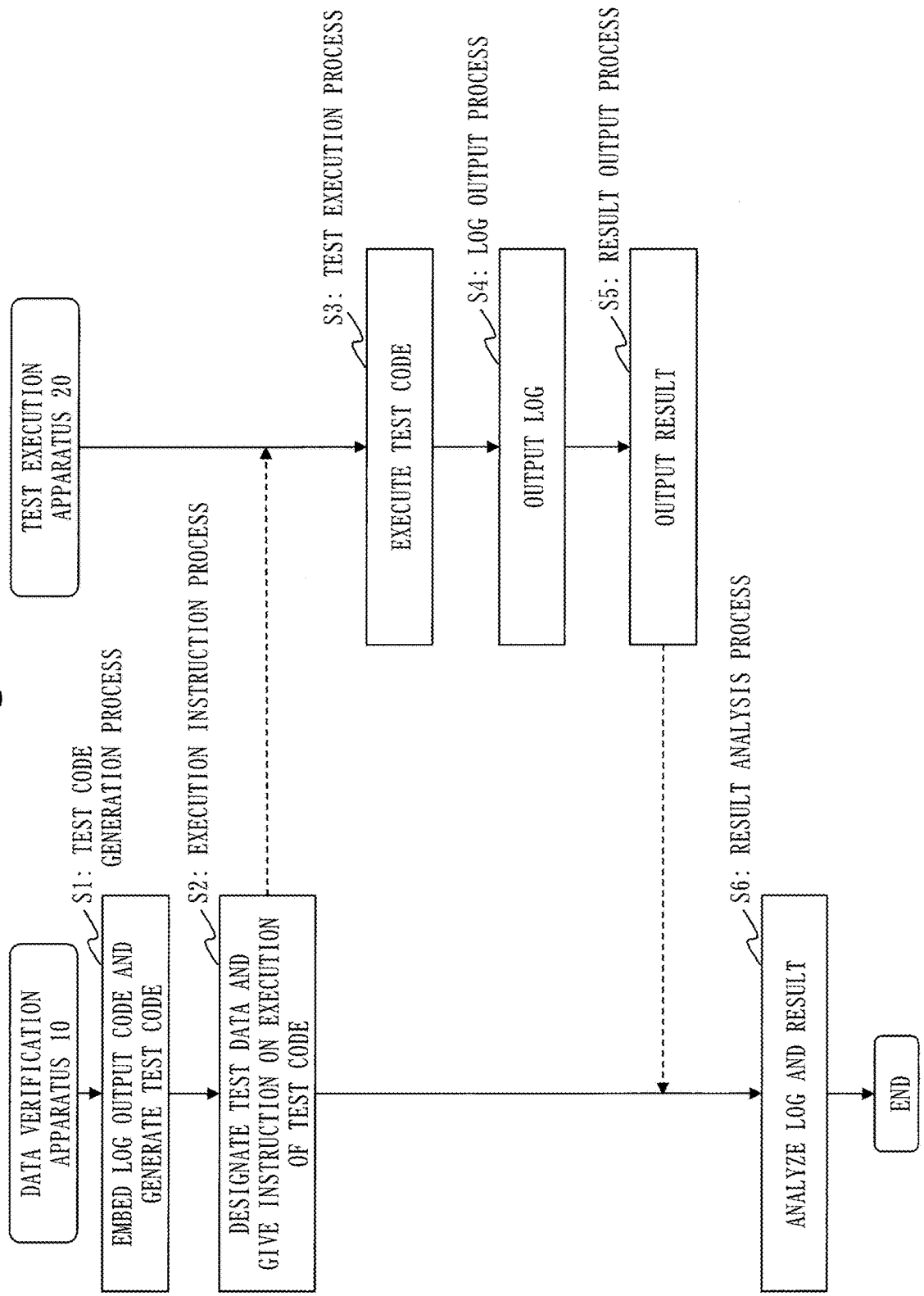
FIG. 4 is a flowchart of processes of the data verification system 1 according to Embodiment 1.

Referring to FIG. 4, a process of the data verification system 1 according to Embodiment 1 will be explained.

(Step S1: Test Code Generation Process)

The embedding unit 111 of the data verification apparatus 10 identifies a referring part that is in a test target source code and refers to definition data. The definition data is data to define data in software, and data used only for reading. The embedding unit 111 embeds a log output code that outputs a log into the referring part identified, and generates a test code. The embedding unit 111 transmits the test code generated to the test execution apparatus 20.

(Step S2: Execution Instruction Process)

The test execution unit 112 of the data verification apparatus 10 designates test data to be provided as an input, and then instructs the test execution apparatus 20 to execute the test code. In doing so, the test execution unit 112 may designate a plurality of test data.

As illustrated in FIG. 5, in the test data storage unit 231 of the test execution apparatus 20, a plurality of test data are stored. Test numbers that are identifiers are assigned to each of the test data. Each of the test data is generated by a developer of the software, or generated by an automatic generation program. The test execution unit 112 designates which test data is to be provided as the input from among the plurality of test data stored in the test data storage unit 231.

(Step S3: Test Execution Process)

The test execution unit 211 of the test execution apparatus 20 reads the test data designated in step S2 from the test data storage unit 231. The test execution unit 211 executes the test code generated in step S1, providing, as the input, the test data read.

When the plurality of test data are designated in step S2, the test execution unit 211 executes the test code, providing each of the test data in order as the input.

(Step S4: Log Output Process)

The log output unit 212 of the test execution apparatus 20 writes in the log storage unit 232, a log outputted by the log output code embedded in the test code executed in step S3.

(Step S5: Result Output Process)

The result output unit 213 of the test execution apparatus 20 writes in the result storage unit 233, a result of the execution of the test code in step S3.

(Step S6: Result Analysis Process)

The result analysis unit 113 of the data verification apparatus 10 analyzes the log written in the log storage unit 232 in step S4 and the result written in the result storage unit 233 in step S5.

Figure 6:
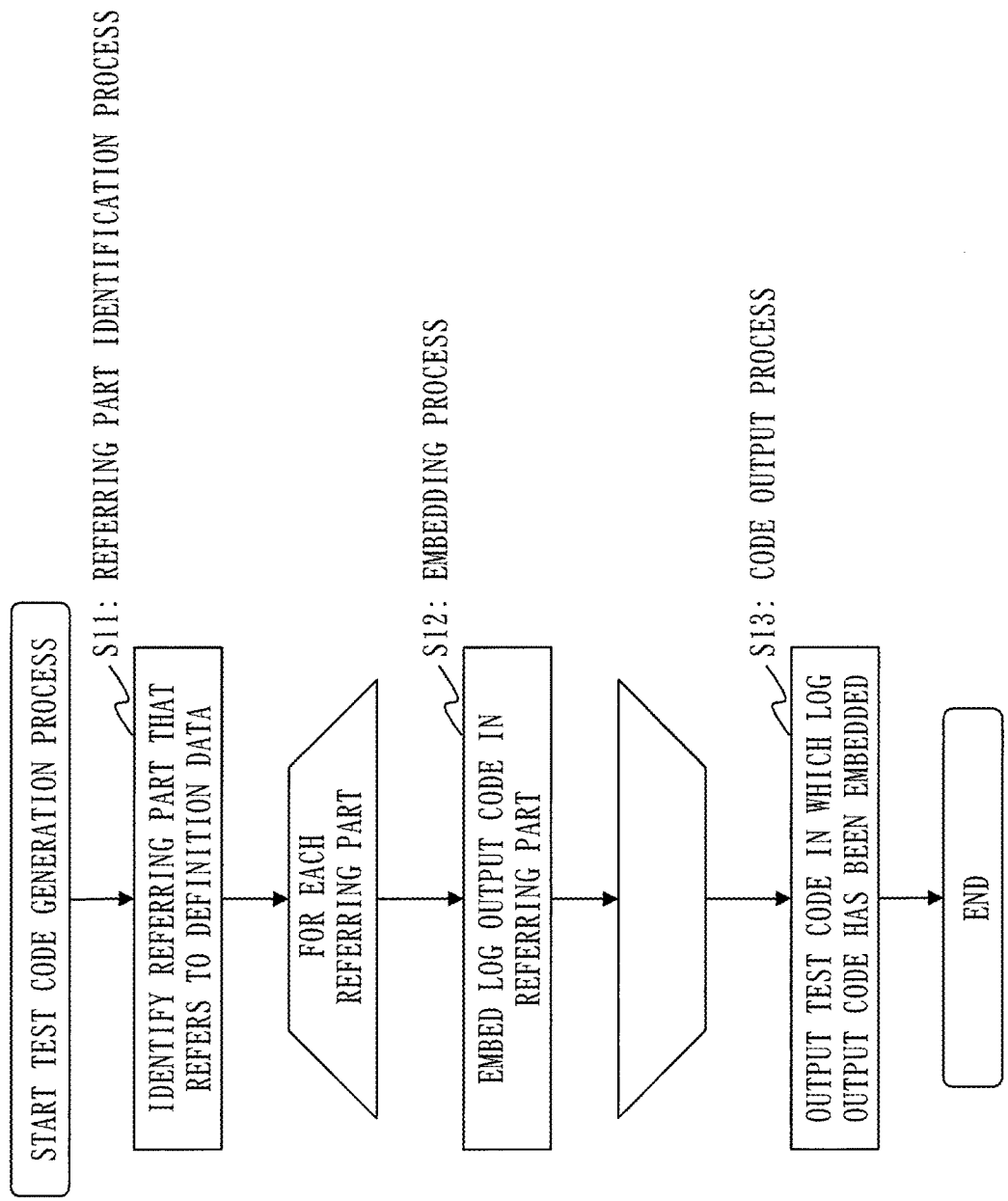
FIG. 6 is a flowchart of a generation process of a test code according to Embodiment 1.

Referring to FIG. 6, the test code generation process according to Embodiment 1 (step S1 in FIG. 4) will be explained.

(Step S11: Referring Part Identification Process)

The embedding unit 111, by searching the source code that is the test target for the referring part that refers to the definition data under a development rule of the source code, identifies the referring part. The embedding unit 111 identifies, if there are a plurality of referring parts, all the referring parts.

Definition data is defined as an aggregate of related items. In other words, the definition data is defined as a structure for software. In addition, in developing a source code, a naming rule of a variable and the like are provided. For example, a rule that "def" should be placed at a head of a variable that establishes the definition data is provided. Therefore, the embedding unit 111 is able to identify the referring part by searching the source code for a structure variable (a name of a structure member) to which a name that is given to a variable that establishes definition data is given.

Next, a process of step S12 is executed for each of the referring parts identified in step S11 in order as a target.

(Step S12: Embedding Process)

The embedding unit 111 embeds the log output code that outputs a log in the target referring part. The log output code is a program code that outputs, as a log, a test number of the test data provided as the input, the variable name of the definition data referred to, and location information that indicates the referring part. The location information is information with which the location of the referring part in the source code can be identified. For example, the location information is a line number in which the log output code is embedded in the source code.

(Step S13: Code Output Process)

The embedding unit 111 transmits to the test execution apparatus 20, the source code in which the log output code has been embedded in step S12, as the test code.

The test code transmitted to the test execution apparatus 20 is stored in the memory 22 after being compiled and linked, as needed.

Figure 7:
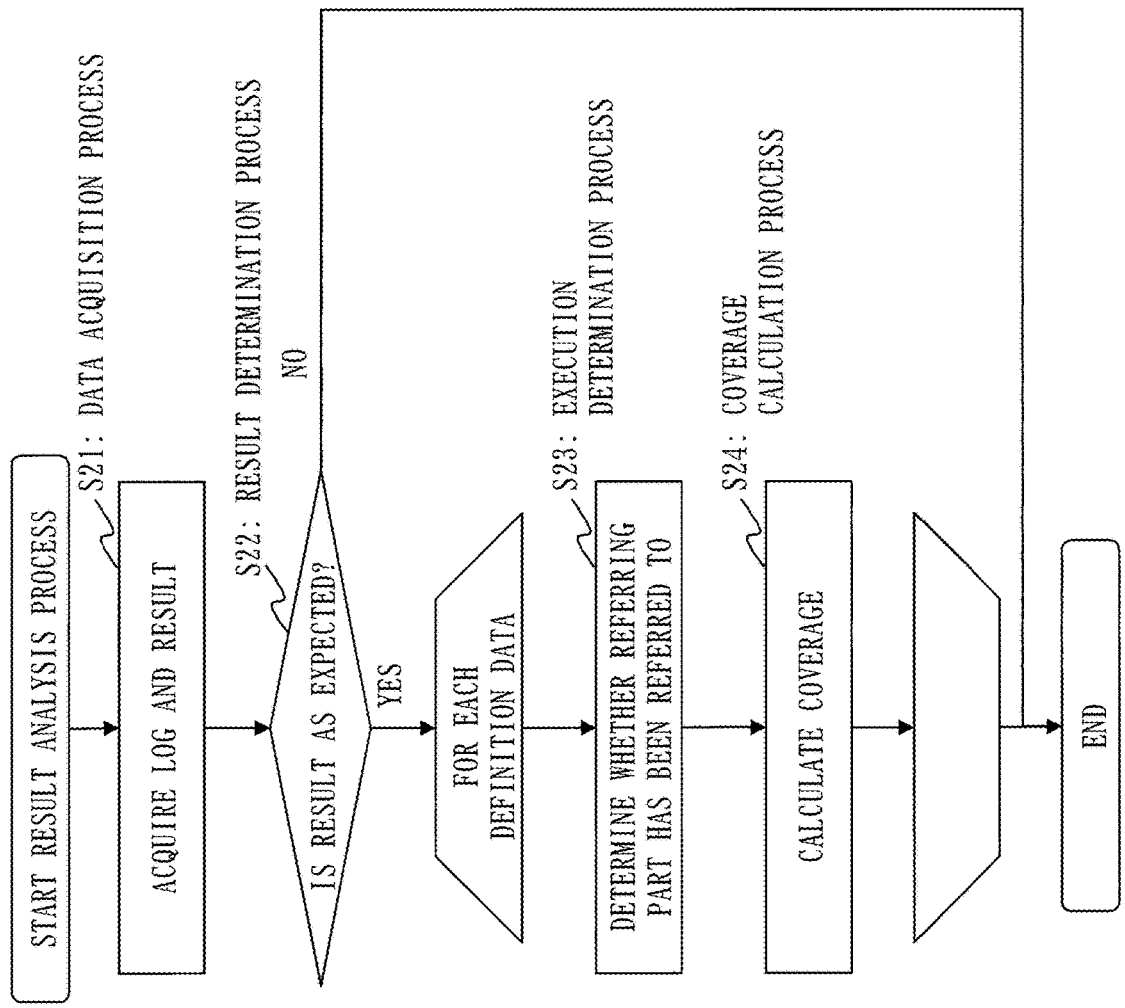
FIG. 7 is a flowchart of a result analysis process according to Embodiment 1.

Referring to FIG. 7, the result analysis process according to Embodiment 1 (step S6 in FIG. 4) will be explained.

(Step S21: Data Acquisition Process)

The result analysis unit 113 acquires the log stored in the log storage unit 232 and the result stored in the result storage unit 233.

(Step S22: Result Determination Process)

The result analysis unit 113 determines whether the result acquired in step S21 meets an expected value in accordance with test standards. In other words, the result analysis unit 113 determines whether the result is as expected or not. As a specific example, by setting the expected value in advance, the result analysis unit 113 compares the result with the expected value, and thereby determines whether the result is as expected or not.

The result analysis unit 113 proceeds with, if the result is as expected, the process to step S23. On the other hand, the result analysis unit 113 terminates, if the result is not as expected, the process.

Next, processes of steps from S23 to S24 are executed for the defined data in order as a target.

(Step S23: Execution Determination Process)

The result analysis unit 113 refers to the log acquired in step S21, and determines whether the referring part that refers to the target definition data has been executed when the test data designated in step S2 has been provided as the input. If there are a plurality of referring parts that refer to the target definition data, the result analysis unit 113 determines whether each of the plurality of referring parts has been executed.

In specific, the result analysis unit 113 searches for the log using the variable name of the target definition data as a keyword, and acquires the location information outputted together with the variable name. The result analysis unit 113 determines, as to the referring part in a location having been identified by the location information acquired, that the referring part has been executed. On the other hand, the result analysis unit 113 determines, as to the referring part in a location not being identified by the location information acquired, that the referring part has not been executed.

(Step S24: Coverage Calculation Process)

The result analysis unit 113 calculates, based on a result acquired in step S23, coverage of the target definition data.

In specific, the result analysis unit 113 calculates a percentage of the number of the referring parts that have been executed to the number of the referring parts that refer to the target definition data, as the coverage.

Advantageous Effects of Embodiment 1

As described above, the data verification system 1 according to Embodiment 1 embeds a log output code that outputs a log in a referring part that refers to definition data, and generates a test code. Then, the data verification system 1 determines, based on a result of execution of the test code, providing, as an input, test data designated, whether the referring part has been executed when the test data designated has been provided as the input.

This enables specification on whether a test of the referring part that refers to the definition data is executed when the test data designated is provided as the input. This facilitates identification of test data of a regression test.

For example, assume that certain definition data is to be modified. In this case, by referring to coverage calculated in step S24 for the definition data to be modified, it is possible to know coverage of a referring part when test data designated is used. This enables determination on whether the test data designated is adequate for a test.

In addition, processes illustrated in FIG. 4 may be executed in advance, instead of being executed when definition data is modified. For example, in a development phase of a target source code, the processes illustrated in FIG. 4 may be executed. If the processes illustrated in FIG. 4 are executed and coverage is calculated in advance, identification of test data is facilitated by referring to the coverage calculated in advance when the definition data is modified.

Other Configurations

<Modification 1>

According to Embodiment 1, functions of each of functional configuration components of the data verification apparatus 10 and the test execution apparatus 20 are realized by software. However, as Modification 1, the functions of each of the functional configuration components of the data verification apparatus 10 and the test execution apparatus 20 may be realized by hardware. As to Modification 1, differences from Embodiment 1 will be explained.

Figure 8:
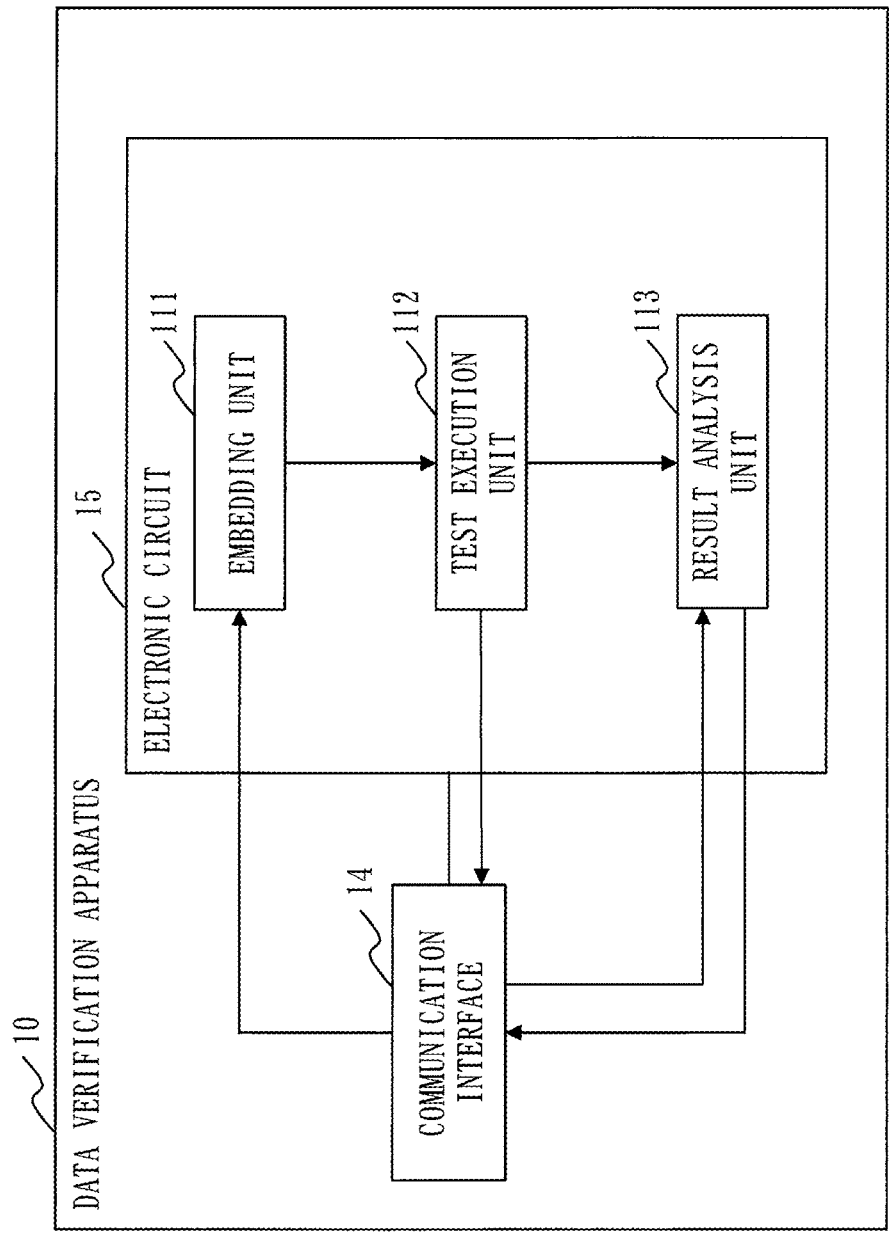
FIG. 8 is a configuration diagram of a data verification apparatus 10 according to Modification 1.

Referring to FIG. 8, a configuration of the data verification apparatus 10 according to Modification 1 will be explained.

If the functions of each of the functional configuration components are realized by hardware, the data verification apparatus 10 includes, instead of the processor 11, the memory 12, and the storage 13, an electronic circuit 15. The electronic circuit 15 is a dedicated electronic circuit that realizes functions of each unit of the data verification apparatus 10, and functions of the memory 12 and the storage 13.

Figure 9:
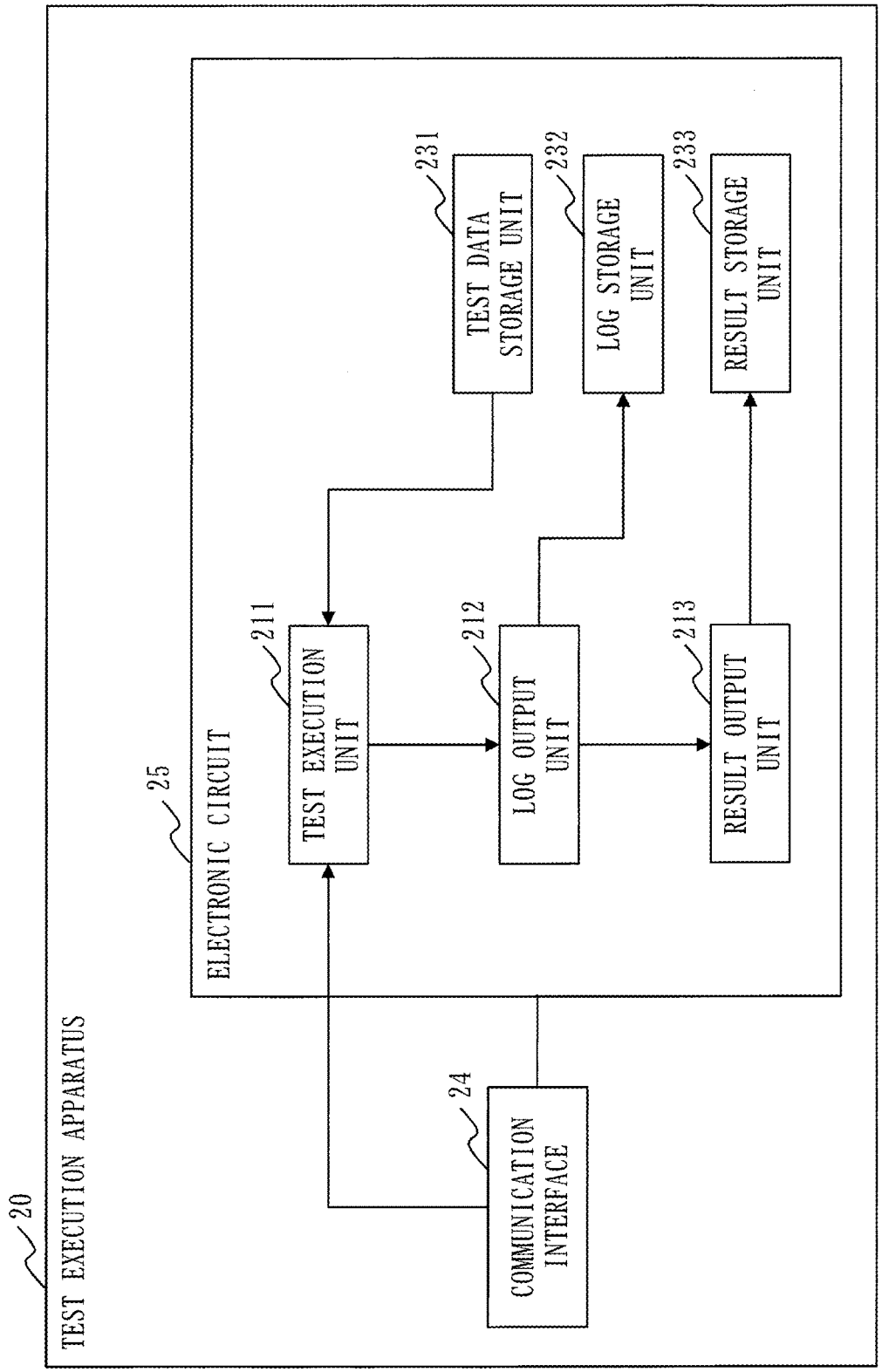
FIG. 9 is a configuration diagram of a test execution apparatus 20 according to Modification 1.

Referring to FIG. 9, a configuration of the test execution apparatus 20 according to Modification 1 will be explained.

If the functions of each of the functional configuration components are realized by hardware, the test execution apparatus 20 includes, instead of the processor 21, the memory 22, and the storage 23, an electronic circuit 25. The electronic circuit 25 is a dedicated electronic circuit to realize functions of each unit of the test execution apparatus 20, and functions of the memory 22 and the storage 23.

The electronic circuits 15 and 25 are supposed to be single circuits, composite circuits, programmed processors, parallel programmed processors, logic ICs, gate arrays (GAs), application-specific integrated circuits (ASICs), and field-programmable gate arrays (FPGAs).

The functions of each unit of the data verification apparatus 10 may be realized by one electronic circuit 15, or the functions of each unit of the data verification apparatus 10 may be distributed to and realized by a plurality of electronic circuits 15. Similarly, the functions of each unit of the test execution apparatus 20 may be realized by one electronic circuit 25, or the functions of each unit of the test execution apparatus 20 may be distributed to and realized by a plurality of electronic circuits 25.

<Modification 2>

As Modification 2, a part of functions may be realized by hardware, and other functions may be realized by software. In other words, from among each of the functional configuration components of the data verification apparatus 10, a part of the functions may be realized by hardware, and the other functions may be realized by software. Similarly, as to the test execution apparatus 20, from among each of the functional configuration components, a part of the functions may be realized by hardware, and the other functions may be realized by software.

The processors 11 and 21, the memories 12 and 22, the storages 13 and 23, and the electronic circuits 15 and 25 are called processing circuits. In other word, the functions of each unit of the data verification apparatus 10 and the test execution apparatus 20 are realized by the processing circuit.

Embodiment 2.

According to Embodiment 2, definition data to be referred to by a referring part that has been executed when test data has been provided as an input is identified for the each test data, which differs from Embodiment 1. In Embodiment 2, an explanation on the difference will be made, but an explanation on same points will be omitted.

Description of Configuration

Figure 10:
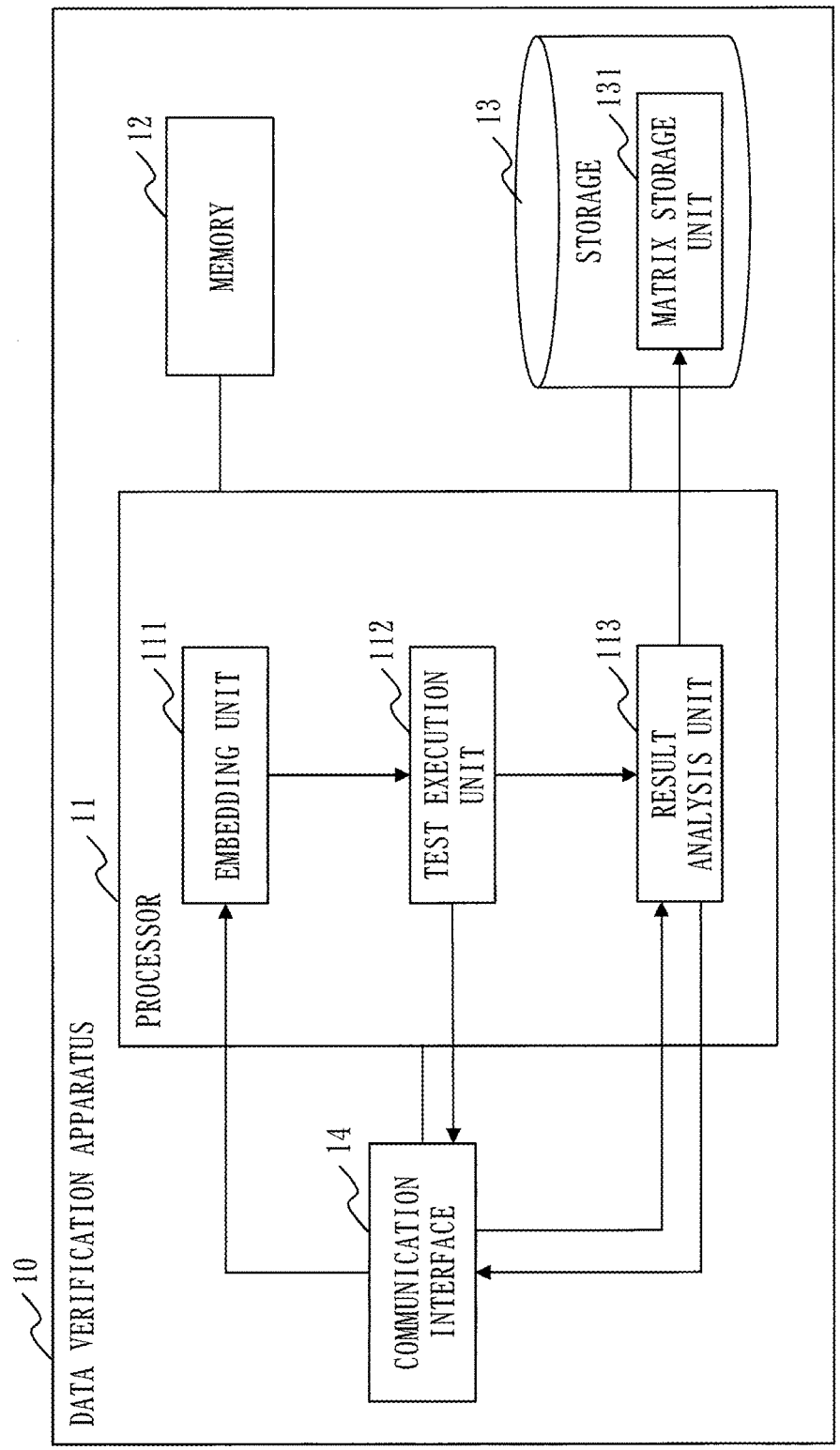
FIG. 10 is a configuration diagram of a data verification apparatus 10 according to Embodiment 2.

Referring to FIG. 10, a configuration of the data verification apparatus 10 according to Embodiment 2 will be explained.

The data verification apparatus 10 differs from the data verification apparatus 10 illustrated in FIG. 2 in a point that the storage 13 realizes a function of a matrix storage unit 131.

Description of Operation

Figure 11:
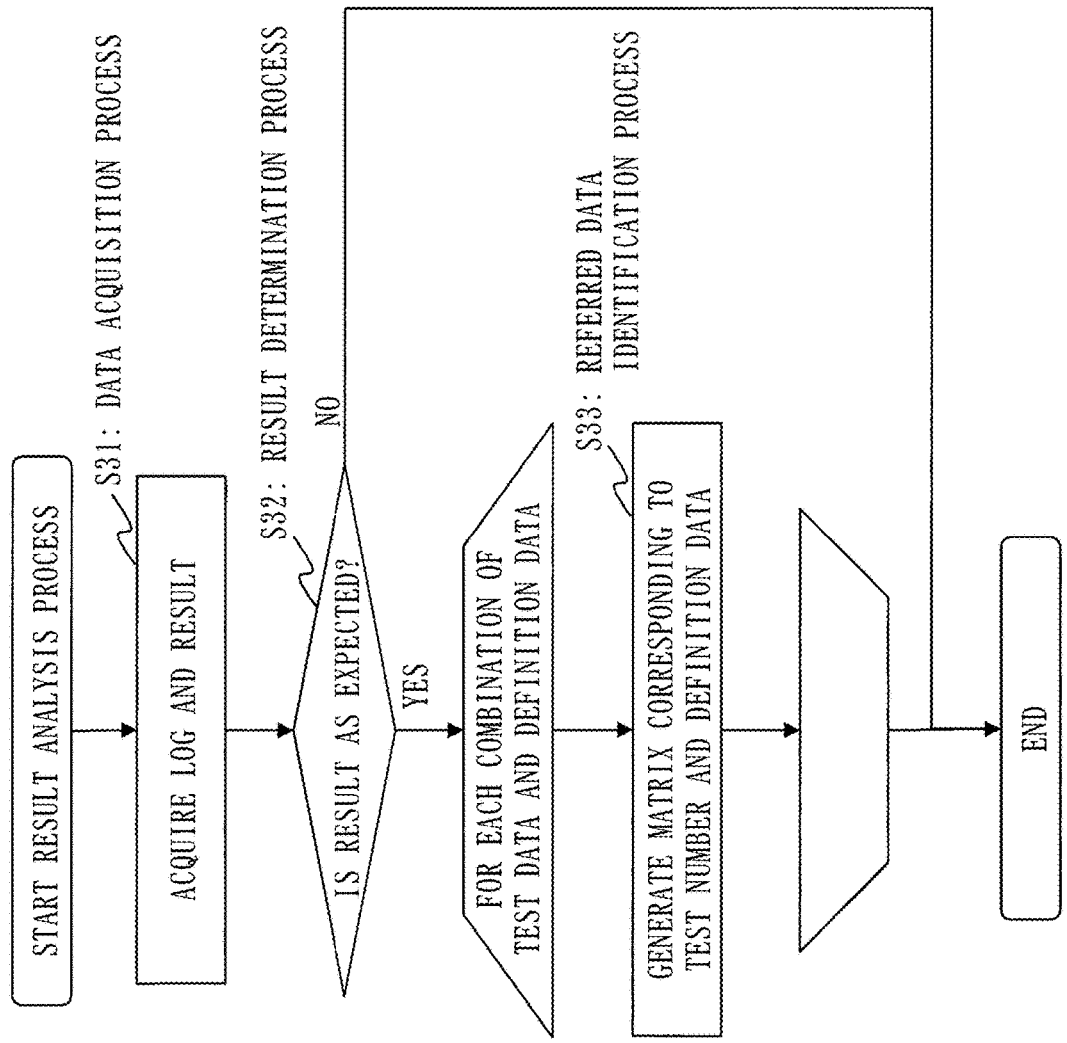
FIG. 11 is a flowchart of a result analysis process according to Embodiment 2.
Figure 12:
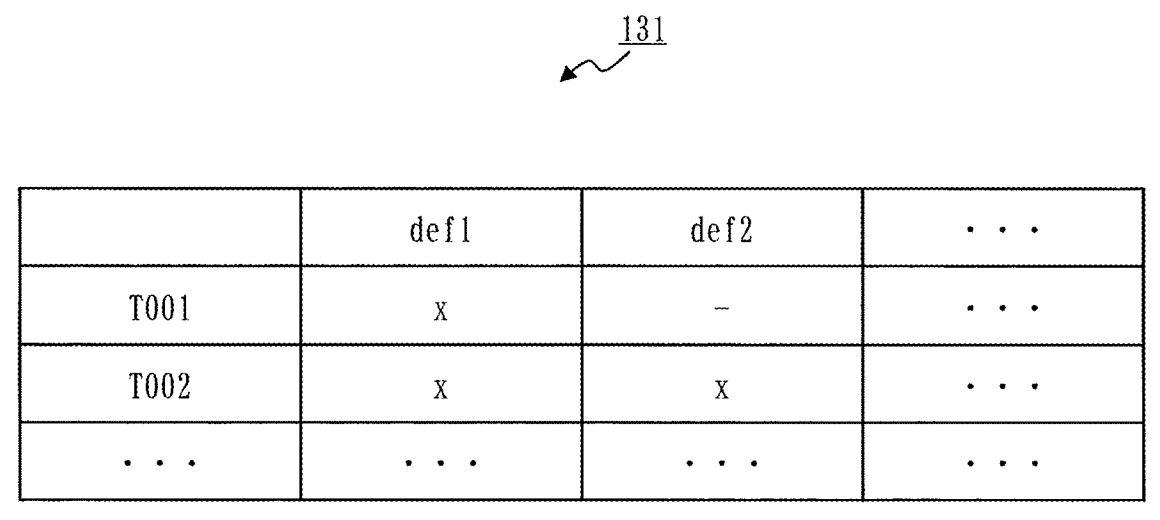

Referring to FIGS. 11 to 13, operation of the data verification system 1 according to Embodiment 2 will be explained.

The operation of the data verification system 1 according to Embodiment 2 corresponds to a data verification method according to Embodiment 2. In addition, the operation of the data verification system 1 according to Embodiment 2 corresponds to processes of a data verification program according to Embodiment 2.

Referring to FIG. 11, a result analysis process according to Embodiment 2 (step S6 in FIG. 4) will be explained.

Processes of steps from S31 to S32 are same as processes of steps from S21 to S22 in FIG. 7.

Next, a process of step S33 is executed for a combination of test data and definition data in order as a target.

(Step S33: Referred Data Identification Process)

The result analysis unit 113 determines whether target definition data has been executed by a referring part that has been executed when target test data has been provided as an input.

The result analysis unit 113 writes, in a matrix stored in the matrix storage unit 131, a result determined. As illustrated in FIG. 12, in the matrix storage unit 131, the matrix in which a test number is set to one of a column and a row, and a variable name of the definition data is set to the other. In FIG. 12, in the matrix storage unit 131, the matrix in which the test numbers are set to the row, and the variable names are set to the column is stored. The result analysis unit 113 writes, in a space corresponding to the test number of the target test data and the variable name of the target definition data, the result determined.

For example, if the test number of the target test data is T001 and the variable name of the target definition data is def1, the result determined is written in a space where a row T001 and a column def1 meets. In FIG. 12, "X" is written if having been executed, and "-" is written if not having been executed.

In other words, the result analysis unit 113 identifies the definition data to be referred to by the referring part that has been executed when the test data designated has been provided as the input, and writes, in the matrix, the result specified.

Referring to FIG. 13, a test data identification process according to Embodiment 2 will be explained.

(Step S41: Definition Data Acceptance Process)

The result analysis unit 113 accepts one or more designations of definition data. Here, the result analysis unit 113 accepts the designation of modified definition data or definition data to be modified.

(Step S42: Test Data Identification Process)

The result analysis unit 113 refers to the matrix stored in the matrix storage unit 131, and identifies test data, the referring part of which refers to the definition data designated in step S41 and has been executed. In specific, the result analysis unit 113 refers to a column to which a variable name of the definition data designated in step S41 is set, and identifies the test data that corresponds to a row in which information to indicate a completion of execution ("X" in FIG. 12) is written.

Advantageous Effect of Embodiment 2

As described above, the data verification system 1 according to Embodiment 2 identifies definition data to be referred to for each test data, and generates a matrix. Then, the data verification system 1, after definition data to be modified being designated, refers to the matrix, and identifies test data that refers to the definition data designated.

This enables mechanical extraction of the test data that refers to the definition data to be modified. In other words, it is possible to mechanically extract test data that a test result might not meet an expected value due to the modification of the definition data. As a result of this, it is possible to mechanically extract necessary test data, and execute a test.

Other Configurations

<Modification 3>

According to Embodiment 2, in step S42 in FIG. 13, the result analysis unit 113 identifies test data that refers to definition data designated. However, the result analysis unit 113 may also accept a designation of the test data, and identify the definition data that is referred to by the test data designated.

<Modification 4>

According to Embodiment 2, in step S42 in FIG. 13, the result analysis unit 113 identifies all test data that refer to definition data designated. However, the result analysis unit 113 may also identify a combination of the test data that refers to each of the definition data designated at least only once. In particular, the result analysis unit 113 may identify a combination of the test data that refers to each of the definition data designated at least only once, the combination consisting of the least amount of test data.

This enables identification of efficient test data that refers to definition data designated thoroughly.

REFERENCE SIGNS LIST

1: data verification system; 10: data verification apparatus; 11: processor; 12: memory; 13: storage; 14: communication interface; 15: electronic circuit; 111: embedding unit; 112: test execution unit; 113: result analysis unit; 131: matrix storage unit; 20: test execution apparatus; 21: processor; 22: memory; 23: storage; 24: communication interface; 25: electronic circuit; 211: test execution unit; 212: log output unit; 213: result output unit; 231: test data storage unit; 232: log storage unit; 233: result storage unit; 30: transmission line.

The invention claimed is:

1. A data verification apparatus comprising:
processing circuitry to:
search a source code to be tested to find a referring part that refers to definition data that has been modified, embed a log output code that outputs a log in each referring part that has been found, and generate a test code, wherein the definition data defines data as an aggregate of related read-only items; and
refer to a log outputted by executing the test code, providing test data as an input, and determine whether each referring part has been executed when the test data has been provided as the input, wherein the log output code, when executed, causes output of a test number associated with the test data, a variable name of the definition data, and a line number of the referring part.

2. The data verification apparatus according to claim 1,
wherein the source code includes a plurality of referring parts; and
wherein the processing circuitry determines whether each of the plurality of referring parts included in the source code has been executed when the test data has been provided as the input.

3. The data verification apparatus according to claim 2,
wherein the processing circuitry calculates coverage that indicates a percentage of the referring parts that have been executed from among the plurality of referring parts.

4. The data verification apparatus according to claim 1,
wherein the processing circuitry refers to the log outputted by executing the test code, providing each of a plurality of test data as the input, and, for each of the plurality of the test data as a target, identifies the definition data to be referred to by the referring part when the target test data is provided as the input.

5. The data verification apparatus according to claim 2,
wherein the processing circuitry refers to the log outputted by executing the test code, providing each of a plurality of test data as the input, and, for each of the plurality of the test data as a target, identifies the definition data to be referred to by the referring part when the target test data is provided as the input.

6. The data verification apparatus according to claim 3,
wherein the processing circuitry refers to the log outputted by executing the test code, providing each of a plurality of test data as the input, and, for each of the plurality of the test data as a target, identifies the definition data to be referred to by the referring part when the target test data is provided as the input.

7. The data verification apparatus according to claim 4,
wherein the processing circuitry identifies test data, the referring part of which refers to definition data designated after the definition data is specified.

8. A non-transitory computer readable medium storing a data verification program that causes a computer to execute:
an embedding process of searching a source code to be tested to find a referring part that refers to definition data that has been modified, embedding a log output code that outputs a log in each referring part that has been found, and generating a test code, wherein the definition data defines data as an aggregate of related read-only items; and
a result analysis process of referring to the log outputted by executing the test code, providing test data as an input, and determining whether each referring part has been executed when the test data has been provided as the input, wherein the log output code, when executed, causes output of a test number associated with the test data, a variable name of the definition data, and a line number of the referring part.

9. The data verification apparatus according to claim 1,
wherein the processing circuitry searches the log using a name of the definition data as a keyword to obtain position information in the source code, and determines whether each referring part has been executed based on whether each referring part has been identified by the obtained position information.

10. A data verification apparatus comprising:
processing circuitry to:
search a source code to be tested to find a referring part that refers to definition data to be modified, embed a log output code that outputs a log in each referring part that has been found, and generate a test code, wherein the definition data defines data as an aggregate of related read-only items; and
refer to a log outputted by executing the test code, providing test data as an input, and determine whether each referring part has been executed when the test data has been provided as the input, wherein the log output code, when executed, causes output of a test number associated with the test data, a variable name of the definition data, and a line number of the referring part.

11. The data verification apparatus according to claim 10,
wherein the source code includes a plurality of referring parts; and
wherein the processing circuitry determines whether each of the plurality of referring parts included in the source code has been executed when the test data has been provided as the input.

12. The data verification apparatus according to claim 11, wherein the processing circuitry calculates coverage that indicates a percentage of the referring parts that have been executed from among the plurality of referring parts.

13. The data verification apparatus according to claim 10, wherein the processing circuitry refers to the log outputted by executing the test code, providing each of a plurality of test data as the input, and, for each of the plurality of the test data as a target, identifies the definition data to be referred to by the referring part that has been executed when the target test data is provided as the input.

14. The data verification apparatus according to claim 11, wherein the processing circuitry refers to the log outputted by executing the test code, providing each of a plurality of test data as the input, and, for each of the plurality of the test data as a target, identifies the definition data to be referred to by the referring part that has been executed when the target test data is provided as the input.

15. The data verification apparatus according to claim 12, wherein the processing circuitry refers to the log outputted by executing the test code, providing each of the plurality of test data as the input, and, for each of the plurality of the test data as a target, identifies the definition data to be referred to by the referring part that has been executed when the target test data is provided as the input.

16. The data verification apparatus according to claim 13, wherein the processing circuitry identifies test data, the referring part of which refers to definition data designated after the definition data is specified.

17. The data verification apparatus according to claim 10, wherein the processing circuitry searches the log using a name of the definition data as a keyword to obtain position information in the source code, and determines whether each referring part has been executed based on whether each referring part has been identified by the obtained position information.

18. A non-transitory computer readable medium storing a data verification program that causes a computer to execute:
an embedding process of searching a source code to be tested to find a referring part that refers to definition data to be modified, embedding a log output code that outputs a log in each referring part that has been found, and generating a test code, wherein the definition data defines data as an aggregate of related read-only items; and
a result analysis process of referring to the log outputted by executing the test code, providing the test data as an input, and determining whether each referring part has been executed when the test data has been provided as the input, wherein the log output code, when executed, causes output of a test number associated with the test data, a variable name of the definition data, and a line number of the referring part.

* * * * *